US008731509B2

(12) United States Patent
Abdel-Kader et al.

(10) Patent No.: US 8,731,509 B2
(45) Date of Patent: May 20, 2014

(54) METHODS AND APPARATUS FOR SIGNAL MONITORING IN A WIRELESS COMMUNICATION NETWORK

(75) Inventors: Sherif Aly Abdel-Kader, Waterloo (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 530 days.

(21) Appl. No.: 12/604,638

(22) Filed: Oct. 23, 2009

(65) Prior Publication Data

US 2011/0096753 A1 Apr. 28, 2011

(51) Int. Cl.
*H04M 11/00* (2006.01)

(52) U.S. Cl.
USPC .......................................... 455/403

(58) Field of Classification Search
None
See application file for complete search history.

(56) References Cited

U.S. PATENT DOCUMENTS

| | | | |
|---|---|---|---|
| 6,542,517 B1 | 4/2003 | Giacalone | |
| 6,781,971 B1 | 8/2004 | Davis et al. | |
| 7,180,884 B2 * | 2/2007 | Elliott et al. | 370/338 |
| 7,398,088 B2 * | 7/2008 | Belkin et al. | 455/439 |
| 7,505,446 B2 * | 3/2009 | Pecen | 370/338 |
| 7,574,212 B2 | 8/2009 | McConnell et al. | |
| 7,768,963 B2 | 8/2010 | Alizadeh-Shabdiz | |
| 7,970,414 B1 * | 6/2011 | Werden et al. | 455/456.1 |
| 8,055,256 B2 * | 11/2011 | Rudowicz et al. | 455/426.1 |
| 8,185,129 B2 * | 5/2012 | Alizadeh-Shabdiz | 455/456.1 |
| 2004/0114553 A1 | 6/2004 | Jiang et al. | |
| 2004/0266426 A1 | 12/2004 | Marsh et al. | |
| 2005/0070288 A1 | 3/2005 | Belkin et al. | |
| 2005/0239497 A1 | 10/2005 | Bahl et al. | |
| 2005/0286466 A1 | 12/2005 | Tagg et al. | |
| 2006/0095954 A1 | 5/2006 | Buckley et al. | |

(Continued)

FOREIGN PATENT DOCUMENTS

| | | |
|---|---|---|
| GB | 2305825 A | 4/1997 |
| WO | 0158201 A1 | 8/2001 |
| WO | 2005099173 A1 | 10/2005 |
| WO | 2009007720 A2 | 1/2009 |

OTHER PUBLICATIONS

Leeuwen et al, "Location Assisted Fast Vertical Handover for UMTS/WLAN Overlay Networks", 2005, pp. 192-202, Springer-Verlag, Belgium.
Itoh et al., "Perfomance of Handoff Algorithm Based on Distance and RSSI Measurements", IEEE Transactions on Vehicular Technology, Nov. 6, 2002, pp. 1460-1468, vol. 51, Issue No. 6.

(Continued)

*Primary Examiner* — Fan Ng
(74) *Attorney, Agent, or Firm* — Ridout & Maybee LLP

(57) ABSTRACT

Techniques in a mobile communication device for signal monitoring in a wireless communication network are described. The mobile device operates for communications over a communication channel of the wireless network. During operation, the mobile device periodically obtains measurements of signal quality of the communication channel at a rate R. In addition, the mobile device obtains a measurement of velocity or acceleration of the mobile device. In response to an increase in the measure of velocity or acceleration, the mobile device increases the rate R. Conversely, in response to a decrease in the measurement of velocity or acceleration, the mobile device decreases the rate R. The measurements of the signal quality may be used to determine whether to initiate a handover to a different wireless network. In one illustrative environment, the initial wireless network is a wireless local area network (WLAN), the other wireless network is a wireless wide area network (WWAN), the signal quality is a received signal strength indication (RSSI) of the communication channel, and the monitoring involves obtaining samples of the RSSI.

11 Claims, 6 Drawing Sheets

(56) References Cited

U.S. PATENT DOCUMENTS

| | | | |
|---|---|---|---|
| 2006/0111112 A1 | 5/2006 | Maveddat | |
| 2006/0234705 A1 | 10/2006 | Oommen | |
| 2006/0276191 A1* | 12/2006 | Hwang et al. | 455/436 |
| 2007/0072595 A1 | 3/2007 | Pi et al. | |
| 2007/0076664 A1 | 4/2007 | An et al. | |
| 2007/0099632 A1 | 5/2007 | Choksi | |
| 2007/0129078 A1 | 6/2007 | De Beer | |
| 2007/0165583 A1 | 7/2007 | Pecen | |
| 2007/0258393 A1* | 11/2007 | Cam-Winget et al. | 370/310 |
| 2008/0101318 A1 | 5/2008 | Taaghol et al. | |
| 2008/0140338 A1 | 6/2008 | No et al. | |
| 2009/0005033 A1 | 1/2009 | Wijayanathan et al. | |
| 2009/0010226 A1 | 1/2009 | Nishimura et al. | |
| 2009/0143026 A1 | 6/2009 | Jaffri et al. | |
| 2009/0296652 A1* | 12/2009 | Rudowicz et al. | 370/331 |

OTHER PUBLICATIONS

Bing et al., "Perfomance Analysis of Vertical Handover in a UMTS-WLAN Integrated Network", The 14th IEEE 2003 International Symposium on Personal, Indoor and Mobile Radio Communication Proceedings, 2003, pp. 187-191.

Zhang et al, "A Location-Based Vertical Handoff Decision Algorithm for Heterogeneous Mobile Networks", Apr. 16, 2007, pp. 1-5.

Guo et al, "An Adaptive Multi-criteria Vertical Handoff Decision Algorithm for Radio Heterogeneous Network", Aug. 15, 2005, pp. 1-5.

Extended European Search Report, EPO Application No. 09173982.1, Mar. 19, 2010.

Majlesi et al, "An Adaptive Fuzzy Logic Based Handoff Algorithm for Hybrid Networks", Signal Processing, 2002 6th International Conference on Aug. 26-30, 2002, Piscataway, NJ, USA. IEEE, vol. 2, pp. 1223-1228.

* cited by examiner

METHODS AND APPARATUS FOR SIGNAL MONITORING IN A WIRELESS COMMUNICATION NETWORK

BACKGROUND

1. Field of the Technology

The present disclosure relates generally to mobile communication devices adapted to operate for communications in a wireless communication network (e.g. a wireless local area network or "WLAN"), including techniques for signal monitoring in the wireless network.

2. Description of the Related Art

A mobile communication device may be adapted for communications in different types of wireless communication networks, such as a wireless local area network (WLAN) (e.g. IEEE 802.11 based wireless network) and a wireless wide area network (WWAN) (e.g. a cellular telecommunications network). It is desirable for these types of mobile communication devices to be handed over reliably and seamlessly from one wireless network (e.g. WLAN) to another wireless network (e.g. WWAN) when necessary. A handover between two different types of wireless networks, such as WLANs and WWANs, may be referred to as a "vertical" handover.

To properly implement a handover, the mobile device should be equipped with a reliable signal quality detection mechanism which can detect when the signal quality of the wireless network is becoming poor. If so, the mobile device can be handed over to the other wireless network in an expedient fashion, so that a communication session of the mobile device can be seamlessly maintained. If the mobile device can quickly detect that it is being moved away from and leaving the wireless network (e.g. the signal quality is quickly becoming poor), it can establish a connection with the other wireless network before its connection with the current wireless network is lost. It is further desirable that the mobile device perform such function in a manner that reduces power consumption.

What are need are methods and apparatus which overcome these and other related or similar shortcomings of the prior art.

BRIEF DESCRIPTION OF THE DRAWINGS

Reference will now be made to the drawings, which show by way of example, embodiments of the present disclosure. Note that, throughout the appended drawings, like features are identified by like reference numerals.

DETAILED DESCRIPTION OF THE EMBODIMENTS

Techniques for signal monitoring by a mobile communication device in a wireless communication network are described. The mobile device operates for communications over a communication channel of the wireless network. During operation, the mobile device periodically obtains, at a rate R, measurements of signal quality of the communication channel. In addition, the mobile device obtains a measurement of velocity or acceleration of the mobile device. In response to an increase in the measurement of velocity or acceleration, the mobile device increases the rate R. Conversely, in response to a decrease in the measurement of velocity or acceleration, the mobile device decreases the rate R. The measurements of signal quality may be used to determine whether to initiate a handover to a different wireless network. In one illustrative environment, the initial wireless network is a wireless local area network (WLAN), the other wireless network is a wireless wide area network (WWAN), the signal quality is a received signal strength indication (RSSI), and the periodic monitoring involves periodically obtaining samples of the RSSI.

Figure 1:
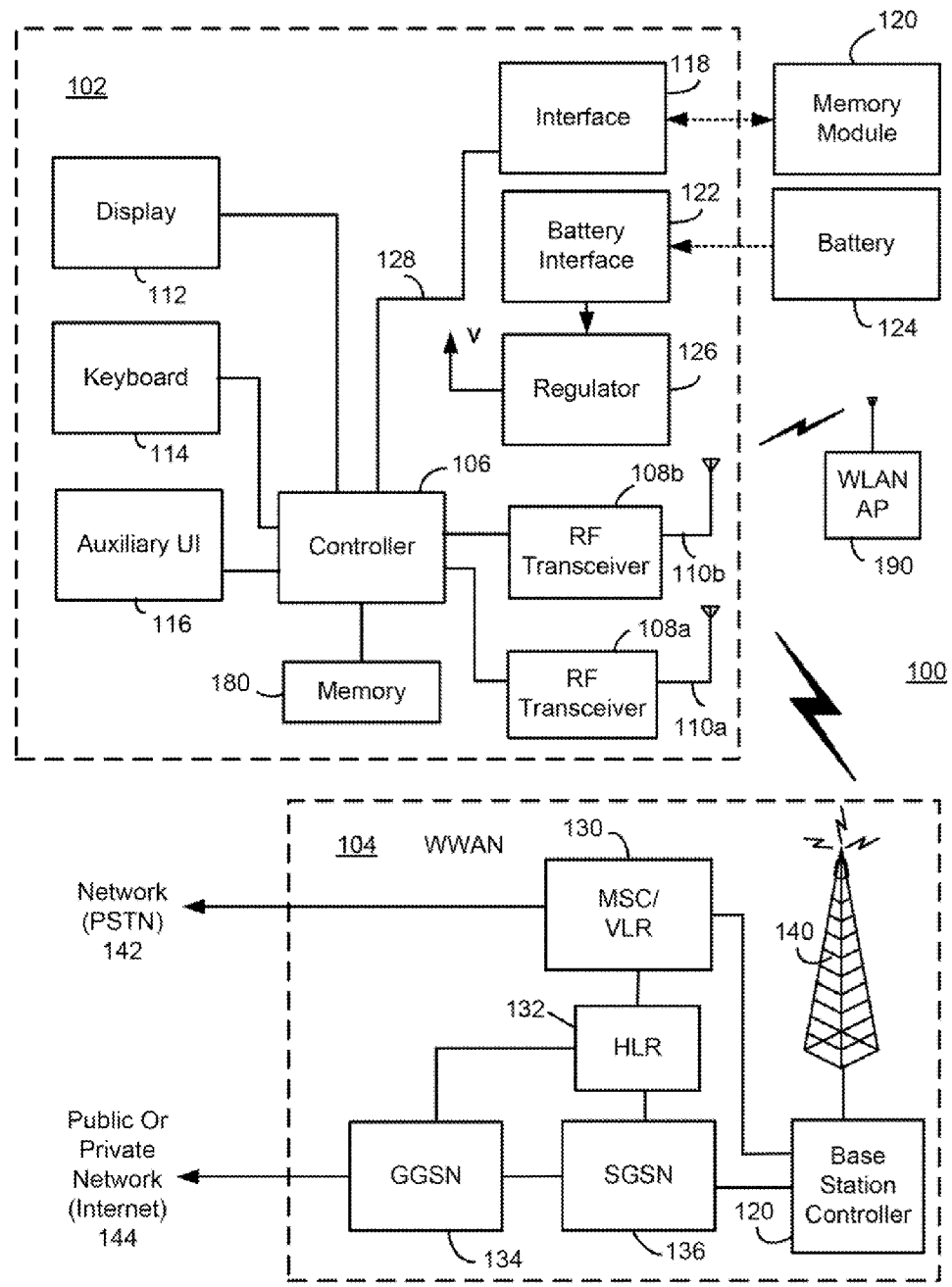
FIG. 1 is a schematic block diagram illustrating the basic components of a mobile communication device operating in a wireless communication system which includes a wireless wide area network (WWAN) (e.g. a GSM/GPRS wireless network) and a wireless local area network (WLAN)

Referring now to the drawings to illustrate one example of the system environment within which the techniques may be practiced, FIG. 1 is a schematic block diagram illustrating the basic components of a mobile communication device 102 which operates in a wireless communication system 100. In the example of FIG. 1, mobile device 102 is adapted to communicate with a wireless communication network 104 which is a cellular telecommunications network (one type of wireless wide area network or "WWAN"). Mobile device 102 is also adapted to communicate with a wireless local area network "WLAN" having a wireless access point (AP) 190, which may be an IEEE 802.11-based wireless network.

For wireless communication with wireless network 104 (i.e. the WWAN), mobile device 102 utilizes radio frequency (RF) transceiver circuitry 108a and an antenna means 110a. For wireless communication with access point 190 of the WLAN, mobile device 102 utilizes RF transceiver circuitry 108b for IEEE 802.11-based communications and an antenna means 110b. With such configuration, mobile device 102 may be referred to as a "dual mode" communication device. Although shown in FIG. 1 as having separate and independent transceiver components, at least some portions or components of these otherwise different transceivers may be shared.

Mobile device 102 may include a visual display 112, a keyboard 114, and perhaps one or more auxiliary user interfaces (UI) 116, each of which is coupled to a controller 106. Controller 106 is also coupled to RF transceiver circuitry 108a and antenna 110a, as well as RF transceiver circuitry 108b and antenna 110b. Typically, controller 106 is embodied as a central processing unit (CPU) which runs operating system software in a memory 180.

Controller 106 will normally control overall operation of mobile device 102, whereas signal-processing operations associated with communication functions are typically executed by the RF transceiver circuitry. In the present disclosure, controller 106 may operate in combination with RF transceiver 108b to perform techniques as described later in relation to FIGS. 3-6.

Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 also includes a battery interface 122 for receiving one or more rechargeable batteries 124. Battery 124 provides electrical power to electrical circuitry in mobile device 102, and battery interface 122 provides for a mechanical and electrical connection for battery 124. This provides wireless operation and portability of mobile device 102. Battery interface 122 is coupled to a regulator 126 which regulates power to the device.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile terminal block diagram of FIG. 1, the RF transceiver circuitry and antenna may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile device 102 may have a more particular implementation as described later in relation to mobile station 202 of FIG. 2.

Mobile device 102 sends communication signals to and receives, communication signals over wireless communication links. For example, mobile device 102 may communicate with wireless network 104 via antenna 110a. RF transceiver circuitry 108a performs functions similar to those of a base station controller 138, including for example modulation/demodulation and possibly encoding/decoding and encryption/decryption. It is also contemplated that RF transceiver circuitry 108a may perform certain functions in addition to those performed by base station controller 138.

In the embodiment shown in FIG. 1, wireless network 104 technology is configured in accordance with Global Systems for Mobile communications (GSM) and General Packet Radio Service (GPRS) standards. Such network may further operate in accordance with Enhanced Data rates for GSM Evolution (EDGE) or Enhanced GPRS (EGPRS). Note, however, wireless network 104 may be based on any other suitable network technology, such as a Long-Term Evolution (LTE)-based network, an EVolution-Data Only (EV-DO)-based network, a UMTS-based network, or High Speed Packet Access (HSPA), as examples. It will be apparent to those skilled in art that the RF transceiver circuitry will be adapted to particular wireless network or networks in which mobile device 102 is intended to operate.

In the example embodiment of FIG. 1, wireless network 104 includes a base station controller (BSC) 138 with an associated base station 140, a Mobile Switching Center (MSC) 130, a Home Location Register (HLR) 132, a Serving GPRS Support Node (SGSN) 136, and a Gateway GPRS Support Node (GGSN) 134. MSC 130 is coupled to BSC 138 and to a landline network, such as a Public Switched Telephone Network (PSTN) 142. SGSN 136 is coupled to BSC 138 and to GGSN 134, which is in turn coupled to a public or private data network 144 (such as the Internet). HLR 132 is coupled to MSC 130, SGSN 136, and GGSN 134. Mobile device 102 also operates using a memory module 120, such as a Subscriber Identity Module (SIM) (or e.g. a Universal SIM or U-SIM, or a Removable User Identity Module or R-UIM), which is connected to or inserted in mobile device 102 at an interface 118. Information between memory module 120 and controller 106 is communicated via a connection 128.

Base station 140 may be a fixed transceiver station, and BSC 138 and base station 140 may together be referred to as fixed transceiver equipment. The fixed transceiver equipment provides wireless network coverage for a particular coverage area commonly referred to as a "cell". The transceiver equipment transmits communication signals to and receives communication signals from mobile terminals within its cell via base station 140. The transceiver equipment normally performs such functions as modulation and possibly encoding and/or encryption of signals to be transmitted to the mobile terminal in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

Again, the WLAN may be an IEEE 802.11-based wireless network which provides communications for mobile device 102 in accordance with IEEE 802.11 standards. Although the present embodiment relates to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network. Even further, IEEE 802.15, a standardization of Bluetooth wireless specification defined by IEEE, is for wireless personal area networks (WPANs). IEEE 802.15 has characteristics such as short-range, low power, low cost, small networks and communication of devices operating within a Personal Operating Space.

Figure 2:
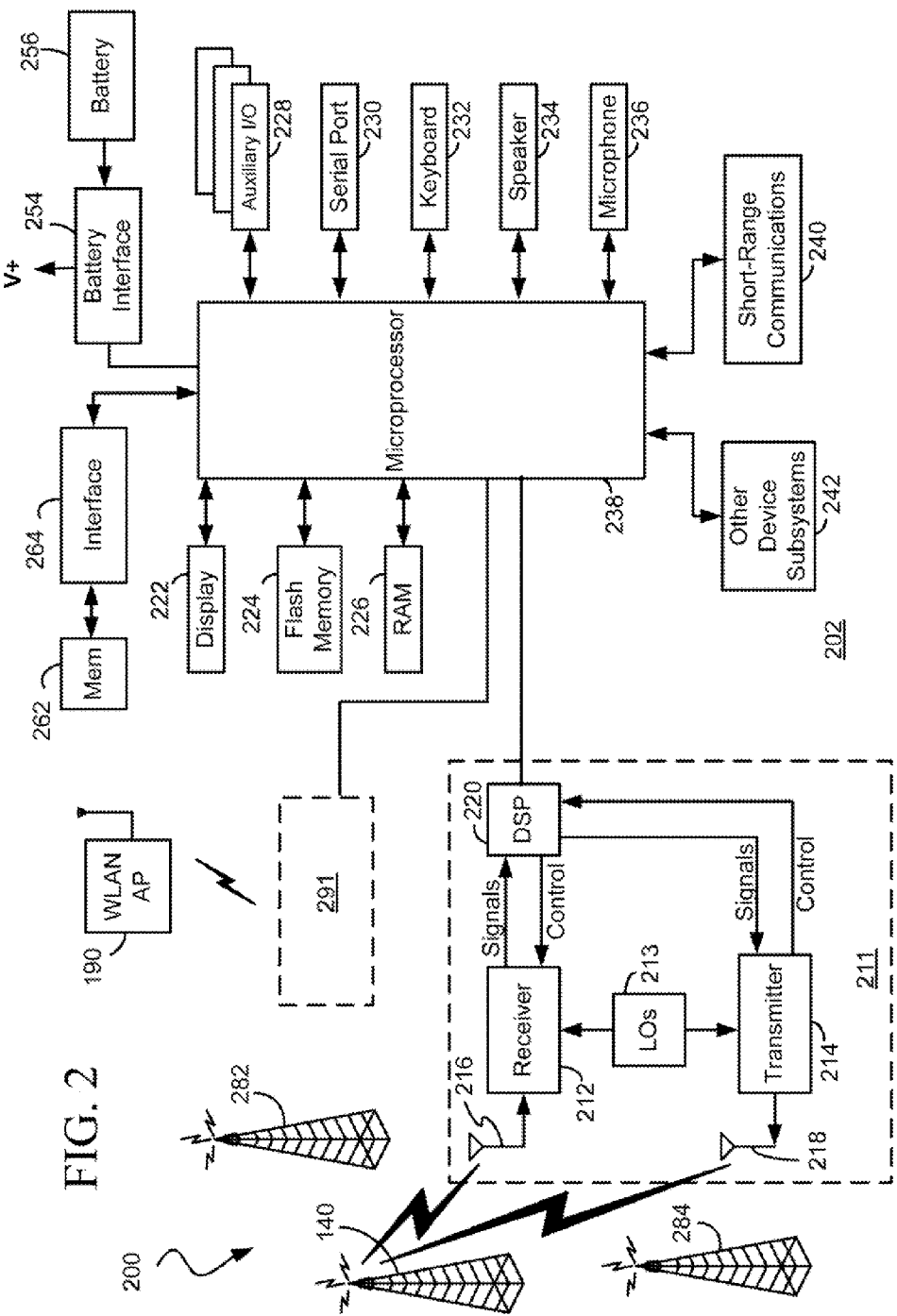
FIG. 2 is a schematic diagram of a particular mobile communication device of FIG. 1, namely a mobile station.

Referring now to FIG. 2, electrical components of one illustrative mobile device 202 (e.g. a mobile station or terminal) will be described. Mobile device 202 is adapted to operate in connection with different communications systems which may be referred to as WLAN and WWAN). Mobile device 202 may be a two-way mobile communication device having at least voice and advanced data communication capabilities, which may include the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). As mobile device 202 is a portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

As described, mobile device 202 is adapted to wirelessly communicate with WLANs, such as the WLAN having AP 190. In addition, mobile device 202 may be adapted to wirelessly communicate with cellular base stations 200 of various WWANs, including base station 140 as well as other base stations 282 and 284. For communication with cellular networks, mobile device 202 utilizes communication subsystem 211. For communication with WLANs, mobile device 202 utilizes an additional communication subsystem 291 which may have similar structural components as communication subsystem 211. With such configuration, mobile device 202 may be referred to as a "dual mode" mobile station. Although shown in FIG. 2 as having separate and independent subsystems, at least some portions or components of these otherwise different subsystems may be shared.

For communications with the WWAN, communication subsystem 211 includes a receiver 212, a transmitter 214, and associated components, such as one or more antenna elements 216 and 218 (e.g. embedded or internal), local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in the art, particular design of communication subsystem 211 depends on the communication network in which mobile device 202 is intended to operate.

Network access is associated with a subscriber or user of mobile device 202, and therefore mobile device 202 requires a memory module 262 (designed as "Mem" in the figure), such as a Subscriber Identity Module or "SIM" card, a Universal SIM (U-SIM), or a Removable User Identity Module (R-UIM), to be inserted in or connected to an interface 264 of mobile device 202 in order to operate in the network. After network procedures have been completed, mobile device 202 may send and receive communication signals through the network. Signals received by antenna 216 through the network are input to receiver 212, which may perform such common receiver functions as signal amplification, frequency down conversion, filtering, channel selection, and the like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

For communications with the WLAN via AP 190, communication subsystem 291 may include modules and processes which operate in accordance with IEEE 802.11 for communications. Communication subsystem 291 may be or include what is referred to as a WLAN driver, with which microprocessor 238 may communicate and control. Communication subsystem 291 may have similar structural components as communication subsystem 211, such as a receiver, a transmitter, and associated components, such as one or more (e.g. embedded or internal) antenna elements, local oscillators (LOs), and a processing module such as a baseband (BB) and media access control (MAC) processing module. As will be apparent to those skilled in the field of communications, the particular design of communication subsystem 291 depends on the communication network in which mobile device 202 is intended to operate. Again, in the present disclosure, communication subsystem 291 (including its associated processor/processing components) are operative in accordance with IEEE 802.11 standards.

Mobile device 202 may send and receive communication signals through AP 190 of the WLAN after required network procedures have been completed. Signals received by its antenna means via the network are input to the receiver, which may perform such common receiver functions as signal amplification, frequency down conversion, filtering, channel selection, and like, including A/D conversion. A/D conversion of a received signal allows more complex communication functions such as demodulation and decoding to be performed in the BB/MAC processing module of communication subsystem 291. In a similar manner, signals to be transmitted are processed, including modulation and encoding, for example, by the BB/MAC processing module. These processed signals are input to the transmitter for D/A conversion, frequency up conversion, filtering, amplification and transmission through the network via the antenna means. The BB/MAC processing module not only processes communication signals, but may also provide for receiver and transmitter control. Note that the receiver, and transmitter may share one or more antennas through an antenna switch, instead of having two separate dedicated antennas.

Mobile device 202 includes a microprocessor 238 that controls overall operation of mobile device 202. This control includes the signal processing techniques of the present disclosure, which may also utilize the BB/MAC processing module of communication subsystem 291 and/or DSP 220 if and as needed. Communication functions, including at least data and voice communications, are performed by communication subsystem 211 and subsystem 291 as described above. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. As apparent, some of these subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, may enable execution of software applications on mobile device 202. A predetermined set of applications that control basic device operations, including at least data and voice communication applications, will normally be installed on mobile device 202 during its manufacture. One application that may be loaded onto mobile device 202 may be a personal information manager (PIM) application having the ability to organize and manage data items relating to the user such as, but not limited to, e-mail, calendar events, voice mails, appointments, and task items. Naturally, one or more memory stores are available on mobile device 202 and SIM 256 to facilitate storage of PIM data items and other information.

The PIM application may have the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 may be a complete alphanumeric keyboard and/or telephone-type keypad. These composed items may be transmitted over a communication network through communication subsystem 211 or 291. For voice communications, the overall operation of mobile device 202 is substantially similar, except that the received signals would be output to speaker 234 and signals for transmission would be generated by microphone 236. Alternative voice or audio I/O subsystems, such as a voice, message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless network. The alternate download path may, for example, be used to load an encryption key onto mobile device 202 through a direct and thus reliable and trusted connection to thereby provide secure device communication. Short-range communications subsystem 240 of FIG. 2 is an additional optional component that provides for communication between mobile device 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Again, although FIGS. 1-2 focus on the use of two specific types of networks (namely a cellular network as the WWAN and an IEEE 802.11 network as the WLAN), any two suitable networks may be utilized, where one of the networks has overlapping coverage with or is contained within the other network (e.g. WiMAX or IEEE 802.16, Home Node-B cells of a 3G macro Radio Access Network (RAN), or BLUETOOTH™, etc.).

Figure 3:
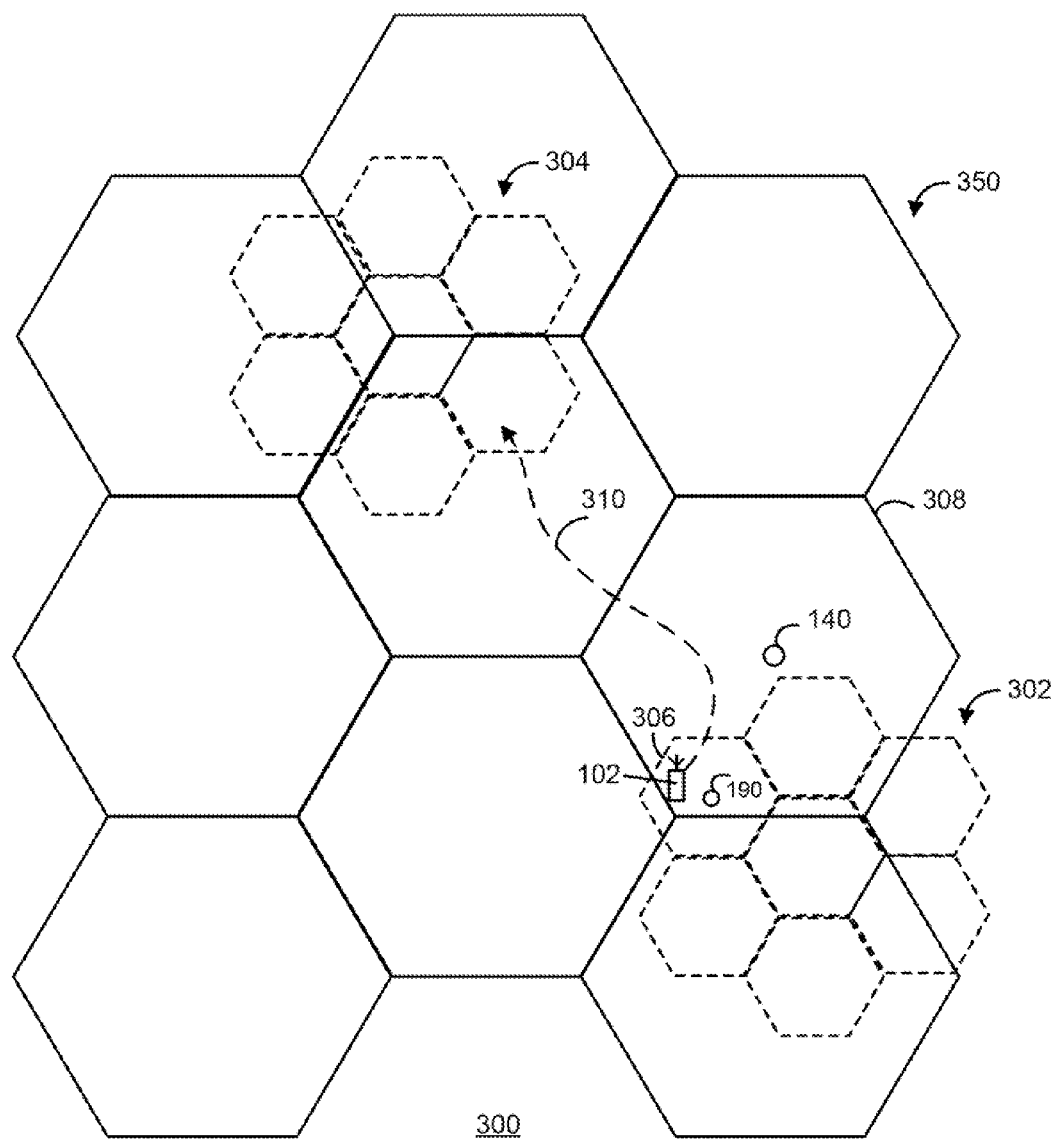
FIG. 3 is a top down view of a geographic region which includes coverage cells of WWANs and WLANs through which the mobile device may traverse.

FIG. 3 is a top down view of coverage cells of different wireless communication networks (e.g. WLAN and WWAN) in a geographic region 300 within which mobile device 102 may be carried. Each network includes those network components and functionality as described in relation to FIGS. 1-2 and known to those skilled in the art. The WWAN (e.g. wireless network 104 of FIG. 1) is associated with a plurality of coverage cells 350 which includes a coverage cell 308 provided by base station 140. The WLAN is associated with a plurality of coverage cells 302 which includes a coverage cell 310 provided by AP 190. Another WLAN is also shown and associated with a plurality of coverage cells 304.

Initially in FIG. 3, mobile device 102 is located within coverage cell 310 of AP 190. A connection between mobile device 102 and the WLAN is established via AP 190 for communications in the WLAN. While operating therein, mobile device 102 receives one or more services made available in the WLAN. The services may be or include a voice telephony service (e.g. VoIP) and/or a data communication service (e.g. Web browsing service, data synchronization service, e-mail message delivery service, etc., facilitated via a packet data communication service).

Mobile device 102 is then carried along a travel path 310, at a particular velocity or acceleration, to be moved outside of coverage cell 310 provided by AP 190 of the WLAN. As a result, the signal quality over a communication channel with the WLAN will become poor. As shown in the figure, there are no other coverage cells of the WLAN to provide coverage for mobile device 102 when continuing along travel path 310. Thus, mobile device 102 will eventually lose signal coverage of the WLAN.

While mobile device 102 still remains in coverage cell 308 of base station 140 of the WWAN, however, mobile device 102 will perform a handover between the WLAN and the WWAN. A handover between the WLAN and the WWAN may be referred to as a "vertical" handover. Thus, a connection between mobile device 102 and the WWAN is established via base station 140 for communications in the WWAN. While operating therein, mobile device 102 receives one or more services made available in the WWAN. The services may be or include a voice telephony service (e.g. VoIP) and/or a data communication service (e.g. Web browsing service, data synchronization service, e-mail message delivery service, etc., facilitated via a packet data communication service). Subsequently, mobile device 102 may enter into a different coverage cell of the WWAN, and even later enter into one of the coverage cells 304 of the other WLAN for communications in the other WLAN.

Note that, if the velocity or acceleration of mobile device 102 is relatively large when leaving coverage cell 310 of the WLAN, mobile device 102 may have insufficient time to properly detect the adverse change in signal quality of the WLAN. Thus, mobile device may not quickly respond and process the switch between the WLAN and the WWAN, and communications for mobile device 102 may be disrupted or dropped as a result. On the other hand, if mobile device 102 is designed with high processing power and speed to ensure expedient detection, mobile device 102 will undesirably have a large power consumption.

Figure 4:
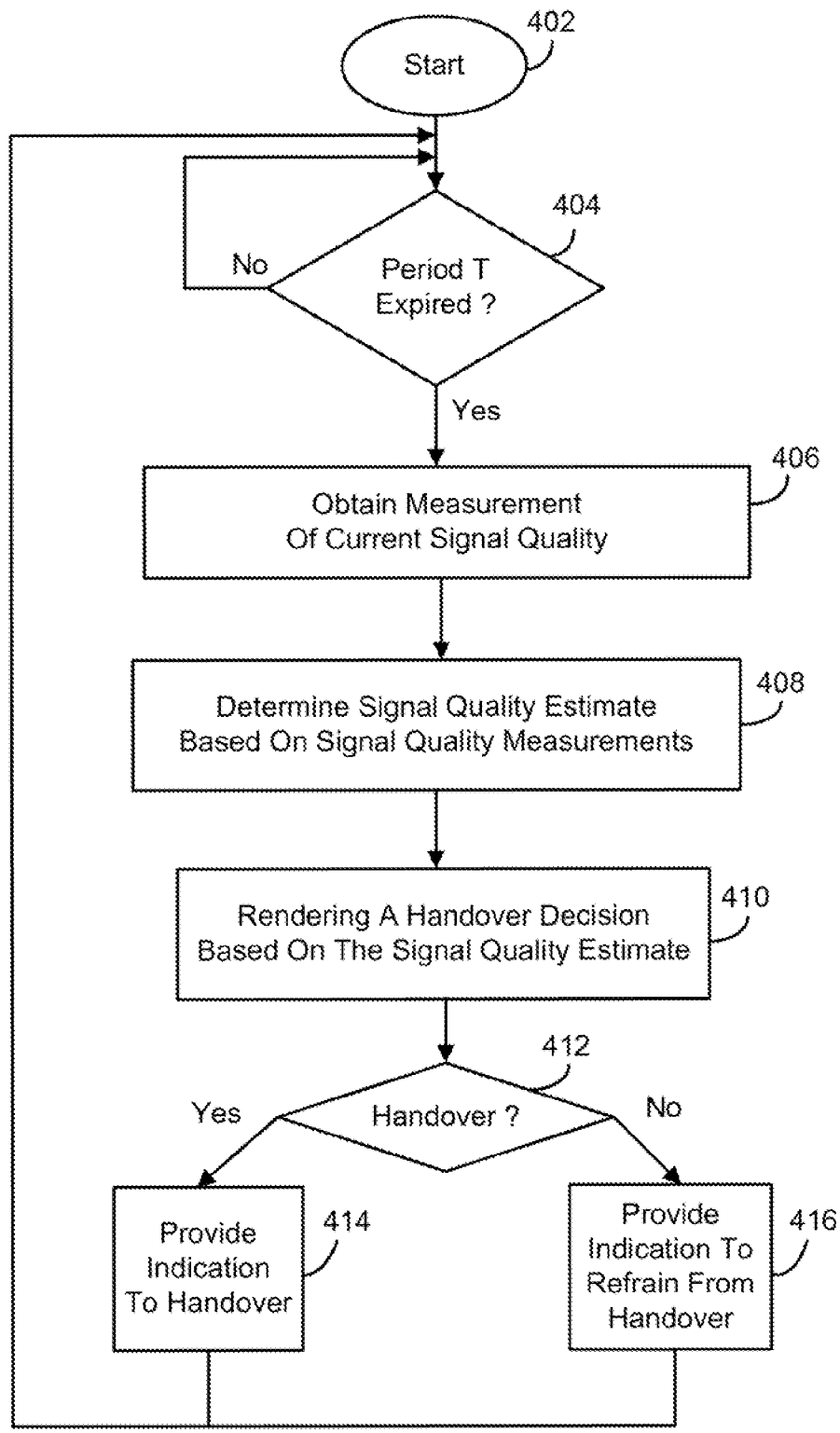
FIGS. 4, 5, and 6 are flowcharts for use in describing a method for signal monitoring in a wireless communication network.
Figure 5:
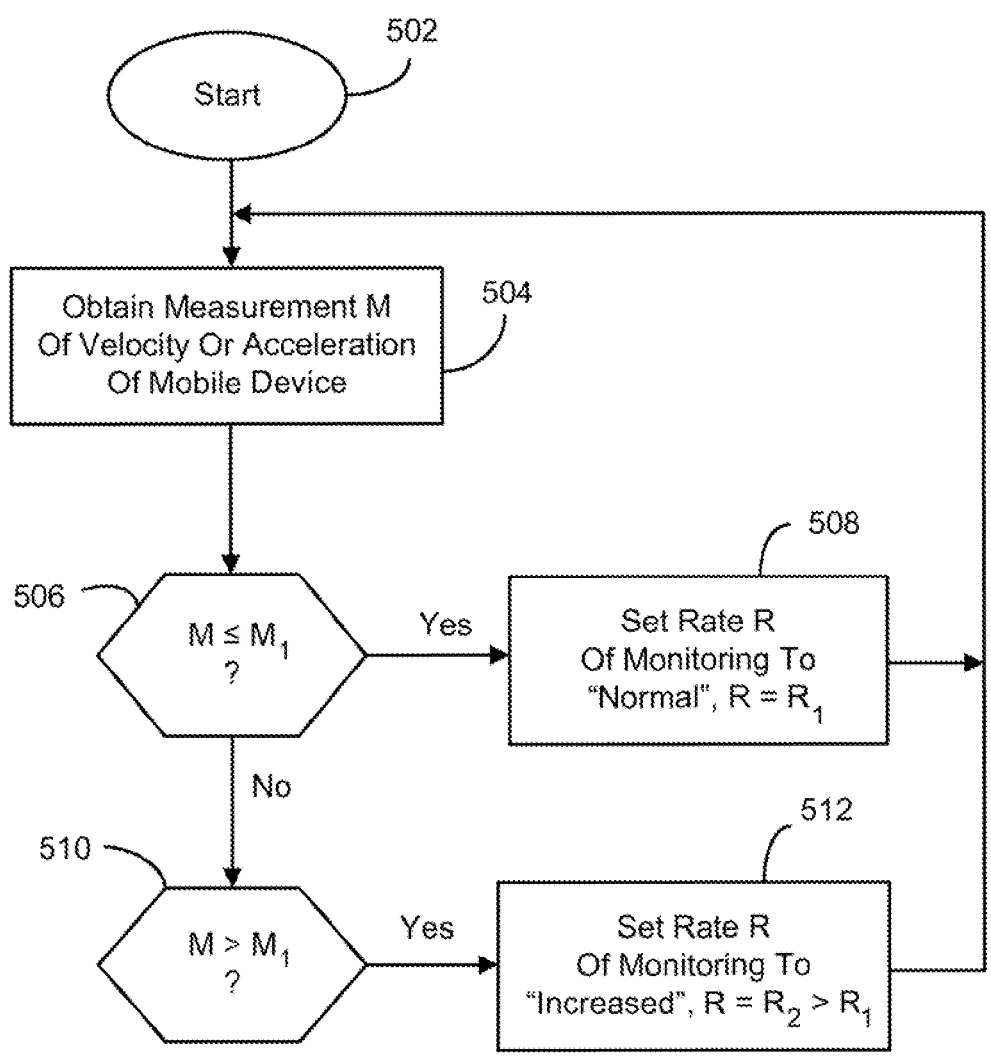
Figure 6:
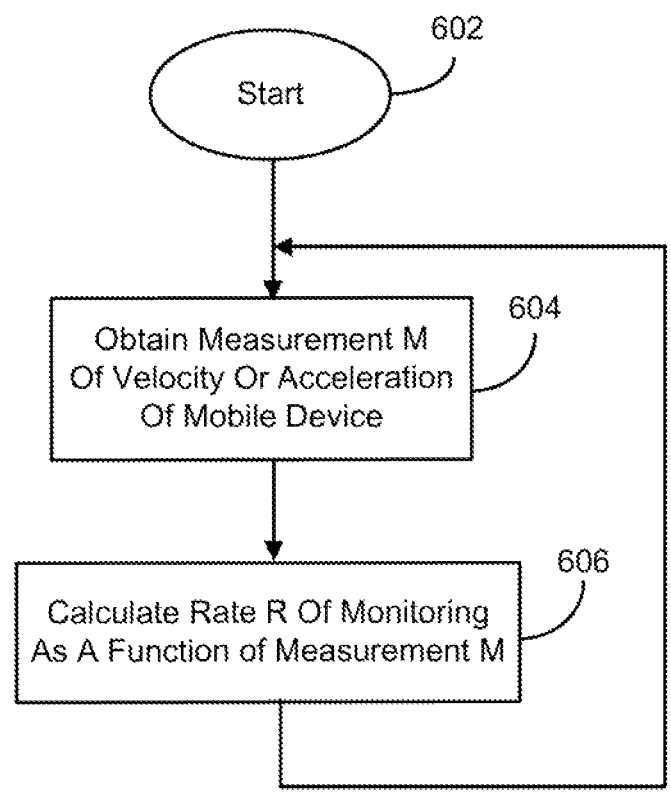

FIGS. 4, 5, and 6 are flowcharts for use in describing a method for signal monitoring in a wireless communication network. The technique described in relation to the flowcharts may be performed by one or more controllers or processors (e.g. controller 106 of FIG. 1, microprocessor 238 of FIG. 2)

of the mobile device (e.g. mobile device 102 of FIGS. 1-2). A computer program product which may embody the technique may include a computer readable medium (e.g. memory or computer disk) having computer instructions stored therein which are executable by the one or more controllers or processors (e.g. controller 106 of FIG. 1, microprocessor 238 of FIG. 2) for performing the technique.

The mobile device is initially located within a coverage cell of a wireless communication network, such as a wireless local area network (WLAN). A connection between the mobile device and the WLAN is established and maintained via an access point (AP) of the WLAN, where communications are provided for the mobile device over a communication channel. The mobile device may receive one or more services made available by the WLAN. The services may be or include a voice telephony service (e.g. VoIP) and/or a data communication service (e.g. Web browsing service, data synchronization service, e-mail message delivery service, etc., facilitated via a packet data communication service).

During mobile device operation, the processor of the mobile device periodically obtains, at a rate R, measurements of signal quality of the communication channel. The rate R of measuring is associated with a period T (i.e. R=1/T) (i.e. a measurement is performed every T units of time). This monitoring may involve a periodic sampling of the signal quality of the communication channel. Thus, beginning at a start block 402 of FIG. 4, the processor identifies whether a time period T from the preceding monitoring event has expired (step 404 of FIG. 4). The processor of the mobile device may run a timer or set a timed interrupt for this purpose. If the period T has expired in step 404, then the processor obtains a current measurement of the signal quality of the communication channel (step 406 of FIG. 4).

The signal quality may be, for example, a received signal strength indication (RSSI) of the receiver. However, any other suitable measurement of signal quality may be utilized, such as a signal-to-noise ratio (SNR), transmission error rate, etc., or combinations of the same. The signal quality may be obtained in and from the transceiver of the mobile device (receiver and/or transmitter) (e.g. RF transceiver 108b of FIG. 1, or communication subsystem 211 of FIG. 2).

Next, the processor determines a signal quality estimate based on signal quality measurements obtained over the communication channel (step 408 of FIG. 4). The signal quality measurements may include the current signal quality measurement and one or more previous signal quality measurements obtained within a current time period. The use of current and previous signal quality measurements may be desirable in order to more accurately observe a "trend" in the signal quality, in contrast to observation of a single current signal quality measurement which may not reflect signal conditions accurately.

The processor then renders a handover decision based on the signal quality estimate (step 410 of FIG. 4). For example, if the signal quality estimate is at or below a predetermined threshold, then the processor may render a decision to perform a handover to maintain communications. Otherwise, if the signal quality estimate is above the predetermined threshold, then the processor may render a decision to maintain communications in the wireless network. So, if the handover decision indicates that a handover may be necessary (step 412 of FIG. 12), then the processor provides an indication to handover (step 414 of FIG. 4). Otherwise, if the handover decision indicates that no handover is necessary in step 414, then the processor provides an indication to refrain from performing the handover (step 416 of FIG. 4). The indication may involve the storage or communication of a message or a bit indication ("0" or "1") to permit or instruct the handover. The flowchart of FIG. 4 repeats starting again at step 404.

FIG. 5 is a flowchart which describes another part of the technique which occurs in parallel with the technique described in relation to FIG. 4. Beginning at a start block 502 of FIG. 5, the processor obtains a measurement M of velocity or acceleration of the mobile device (step 504 of FIG. 5). The measurement M of velocity or acceleration may be obtained in a number of different ways. For example, the mobile device may be equipped with a Global Positioning System (GPS) receiver and determine a measurement of velocity based on signals received from the GPS receiver. Alternatively, the mobile device may be equipped with an accelerometer and obtain a measurement of acceleration based on signals received from the accelerometer. As another alternative, the mobile device may maintain a count of the number of times cells of a different wireless network have been selected and/or reselected and determine a measurement of velocity based on the count.

If the measurement $M \leq M_1$, where $M_1$ is a predetermined threshold, then the processor sets the rate R of monitoring (or its associated period T) to "normal" or $R=R_1$ (step 508 of FIG. 5). Otherwise, if the measurement $M > M_1$, then the processor sets the rate R of monitoring (or its associated period T) to "increased" or $R=R_2$, where $R_2 > R_1$ (step 512 of FIG. 5). The technique of FIG. 5 repeats starting again at step 504 of obtaining another measurement of velocity or acceleration. In a variation of this embodiment, a plurality of different thresholds (e.g. $M_1$, $M_2$, $M_3$, etc.) are utilized for setting the rate R or its associated period T to a plurality of different corresponding values.

To illustrate by example, the mobile device may set the rate R of monitoring to have a period T of 100 milliseconds (ms) when the measurement of velocity is at or above 20 kilometers per hour (km/hr); on the other hand, the mobile device may set the rate R of monitoring to have a period T of 2 seconds when the measurement of velocity is below 5 km/hr. Again, these are only examples to help illustrate advantages of the present techniques.

FIG. 6 is a flowchart which describes a variation on the technique of FIG. 5 which may also occur in parallel with the technique described in relation to FIG. 4. Beginning at a start block 602 of FIG. 6, the processor obtains a measurement M of velocity or acceleration of the mobile device (step 604 of FIG. 6). The measurement M of velocity or acceleration may be obtained in a number of different ways as described in relation to step 504 of FIG. 5. Next, the mobile device calculates a rate R of monitoring as a function of the measurement M. For example, the rate R may be a linear function of and/or be directly proportional to the measurement M. This relationship may be such that, as the measurement M increases, the rate R increases; conversely, as the measurement M decreases, the rate R decreases. As another example, the rate R may be an exponential or logarithmic function (or like function) of the measurement M. As yet another example, the rate R may be a step function similar or the same as that described in relation to FIG. 5. However, more than one step may be provided; two, three, four, or five steps may be provided, as examples. The technique of FIG. 6 repeats starting again at step 604 of obtaining another measurement of velocity or acceleration.

As described above in relation to step 504 of FIG. 5 and step 604 of FIG. 6, the measurement M of velocity or acceleration of the mobile device may be obtained in a number different ways. If the mobile device is equipped with a GPS receiver, for example, the mobile device may use the GPS receiver to periodically receive its location L. Based on a current location $L_C$ and a previous location $L_P$ of the mobile device, the mobile device may determine a distance traveled D (e.g. $D=L_C-L_P$). Based on the distance D and the time between location samples, the mobile device may determine its measurement of velocity V. Here, the velocity V may be based on the expression $V=D/\Delta T_S$, where $\Delta T_S$ is the time between samples of the location. Alternatively, the mobile device may monitor a wireless network that is equipped with a location determination mechanism which includes a GPS component or the like. In this case, the mobile device periodically receives its location from the wireless network to determine its measurement of velocity V in the same or similar manner.

In another embodiment of step 504 or step 604, while operating in the wireless network the mobile device may regularly or continually operate a different RF transceiver (e.g. RF transceiver 108b of FIG. 1) for communications a different wireless network (e.g. WWAN or cellular network of FIG. 1). Here, the processor may count the number of different cells selected by the mobile device in the different wireless network over a fixed period of time. The processor stores and maintains this count in memory. In such embodiment, the measurement of velocity of the mobile device is based on the count of the number of different cells selected by the mobile device. For example, the larger the count of the number of different cells selected for communications over the fixed period of time, the larger the measurement of velocity of the mobile device. In addition or alternatively, the processor may count of the number of times the same cell has been reselected by the mobile device in the different wireless network (e.g. WWAN or cellular network). The larger the count of the number of times the same cell has been reselected for communications over the fixed period of time, the smaller the measurement of velocity of the mobile device. Additional details of such operation are described in U.S. Pat. No. 7,505, 446 B2, which is hereby incorporated by reference herein.

As described above, in one favoured configuration, the mobile device is equipped with a reliable and responsive signal quality detection mechanism with reduced power consumption. The mobile device is able to quickly detect that it is being moved away from and leaving a wireless network (e.g. the signal quality is quickly becoming poor), so that it can establish a connection with another wireless network (e.g. WWAN) before its connection with the current wireless network (e.g. WLAN) is lost. A communication session of the mobile device can therefore be seamlessly maintained. Advantageously, the mobile device performs such function in a manner that reduces power consumption, as the signal processing speed of the mobile device can be set low but increased when needed.

Thus, techniques for signal monitoring by a mobile communication device in a wireless communication network have been described. The mobile device operates for communications over a communication channel of the wireless network. During operation, the mobile device periodically obtains measurements of signal quality of the communication channel at a rate R. In addition, the mobile device obtains a measurement of velocity or acceleration of the mobile device. In response to an increase in the measurement of velocity or acceleration, the mobile device increases the rate R. Conversely, in response to a decrease in the measurement of velocity or acceleration, the mobile device decreases the rate R. The measurements of signal quality may be used to determine whether to initiate a handover to a different wireless network. In one illustrative environment, the initial wireless network is a WLAN, the other wireless network is a WWAN (e.g. a cellular telecommunications network), the signal quality is an RSSI, and the periodic monitoring involves periodically obtaining samples of the RSSI.

While the steps of the methods are shown as occurring in a particular order, it will be appreciated by those skilled in the art that many of the steps are interchangeable and may occur in different orders than that shown without materially affecting the end results of the methods. Further, although the present embodiment relates to a WLAN of the IEEE 802.11 type and a WWAN of the cellular network type, any suitable wireless network technologies may be utilized, such as WiMAX technologies (e.g. IEEE 802.16e-based technologies), Bluetooth or IEEE 802.15 which is a standardization of Bluetooth wireless specification defined by IEEE for wireless personal area networks (WPANs), as examples.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device configured to operate for communications over a communication channel of a wireless local area network (WLAN), the method comprising:
   receiving, at the mobile communication device, signals over the communication channel of the WLAN;
   sampling, at the mobile communication device at a rate R, a received signal strength indication (RSSI) of the signals received over the communication channel;
   obtaining at the mobile communication device a measurement M of velocity or acceleration of the mobile communication device;
   repeating the acts of receiving, sampling, and obtaining;
   in response to the measure $M \leq M_1$, setting the rate $R=R_1$ at the mobile communication device;
   in response to the measure $M>M_1$, setting the rate $R=R_2$ at the mobile communication device, where $R_2>R_1$;
   determining at the mobile communication device a signal quality estimate of the communication channel based on a plurality of samples received from the sampling of the RSSI at the rate R; and
   providing an indication to permit handover to a wireless wide area network (WWAN) based on the signal quality estimate.

2. The method of claim 1, wherein the WWAN comprises a cellular telecommunications network.

3. The method, of claim 1, wherein the act of obtaining the measurement of the velocity or the acceleration is obtained through use of a global positioning system (GPS) receiver or an accelerometer of the mobile communication device.

4. The method of claim 1, which is performed by computer instructions stored in a non-transitory computer readable medium, the computer instructions being executable on one or more processors of the mobile communication device.

5. The method of claim 1, wherein the WLAN is operative in accordance with IEEE 802.11 standards.

6. The method of claim 1, wherein obtaining the measurement M of velocity or acceleration of the mobile communication device comprises obtaining a measurement of velocity of the mobile communication device.

7. A mobile communication device, comprising:
   a radio frequency (RF) transceiver configured to receive signals over a communication channel of a wireless local area network (WLAN);
   controller circuitry coupled to the RF transceiver;

the controller circuitry being configured to:
sample, at the mobile communication device at a rate R, a received signal strength indication (RSSI) of the signals received over the communication channel;
obtain at the mobile communication device a measurement M of velocity or acceleration of the mobile communication device;
repeat the receiving, the sampling, and the obtaining;
in response to the measure $M \leq M_1$, set at the mobile communication device the rate $R=R_1$;
in response to the measure $M > M_1$, set at the mobile communication device the rate $R=R_2$ where $R_2 > R_1$;
determine at the mobile communication device a signal quality estimate of the communication channel based on a plurality of samples received from sampling the RSSI at the rate R; and
provide from the mobile communication device an indication to permit handover to a wireless wide area network (WWAN) based on the signal quality estimate.

8. The mobile communication device of claim 7, wherein the WWAN comprises a cellular telecommunications network.

9. The mobile communication device of claim 7, wherein the controller circuitry is further configured to obtain the measurement of the velocity or the acceleration through use of a global positioning system (GPS) receiver or an accelerometer of the mobile communication device.

10. The mobile communication device of claim 7, wherein the WLAN is operative in accordance with IEEE 802.11 standards.

11. The mobile communication device of claim 7, wherein the controller is further configured to obtain the measurement M of velocity or acceleration of the mobile communication device by obtaining a measurement of velocity of the mobile communication device.

* * * * *